(12) United States Patent
Smith

(10) Patent No.: US 8,303,038 B2
(45) Date of Patent: Nov. 6, 2012

(54) ADJUSTABLE VEHICLE HEAD RESTRAINT ASSEMBLY

(75) Inventor: Rodger Smith, Shropshire (GB)

(73) Assignee: Lear Corporation, Southfield, MI (US)

( * ) Notice: Subject to any disclaimer, the term of this patent is extended or adjusted under 35 U.S.C. 154(b) by 334 days.

(21) Appl. No.: 12/178,191

(22) Filed: Jul. 23, 2008

(65) Prior Publication Data

US 2010/0019559 A1    Jan. 28, 2010

(51) Int. Cl.
A47C 7/36    (2006.01)

(52) U.S. Cl. .................... 297/408; 297/404; 297/410

(58) Field of Classification Search ................. 297/391, 297/404, 408, 409, 410

See application file for complete search history.

(56) References Cited

U.S. PATENT DOCUMENTS

| | | | |
|---|---|---|---|
| 4,265,482 A | | 5/1981 | Nishimura et al. |
| 4,351,563 A | * | 9/1982 | Hattori ........................... 297/408 |
| 4,370,898 A | * | 2/1983 | Maruyama ....................... 74/540 |
| 4,779,929 A | | 10/1988 | Küchemann |
| 5,236,245 A | * | 8/1993 | Harrell ........................... 297/408 |
| 5,738,412 A | | 4/1998 | Aufrere et al. |
| 5,842,738 A | * | 12/1998 | Knoll et al. ............... 297/216.12 |
| 5,964,505 A | * | 10/1999 | Koenig et al. ................. 297/408 |
| 6,000,760 A | * | 12/1999 | Chung .......................... 297/408 |
| 6,983,989 B1 | | 1/2006 | Veine et al. |
| 2005/0156456 A1 | | 7/2005 | Robinson et al. |

FOREIGN PATENT DOCUMENTS

| | | |
|---|---|---|
| DE | 10149455 A1 | 4/2003 |
| DE | 10 2004 017 800 B3 | 8/2005 |
| EP | 0267503 A2 | 5/1988 |
| EP | 0283863 A1 | 9/1988 |
| EP | 0970896 A2 | 1/2000 |
| ES | 2027150 | 5/1992 |
| GB | 2240920 A | 8/1991 |
| WO | 2005/068252 A1 | 7/2005 |

OTHER PUBLICATIONS

Office Action dated Apr. 8, 2010 in corresponding German Appn. No. 10 2009 033 306.1-16, 3 pgs.
Chinese Office Action dated Jun. 2, 2011 in corresponding China Appn. No. 2009/10160646.5, filed Jul. 22, 2009, 3 pgs.

* cited by examiner

Primary Examiner — David Dunn
Assistant Examiner — Philip Gabler
(74) Attorney, Agent, or Firm — Brooks Kushman P.C.

(57) ABSTRACT

A vehicle head restraint assembly may be provided with a support rod adapted to be mounted to a seat back of a vehicle seat. A rear housing may be mounted to the support rod. A front housing may be pivotally connected to the support rod. A locking arm may be mounted to one of the support rod and the front housing. A release mechanism may be mounted to one of the front housing and the rear housing and operably engaged with the locking arm. Actuation of the release mechanism may disengage the locking arm to pivot the front housing forward relative to the support rod.

17 Claims, 5 Drawing Sheets

ADJUSTABLE VEHICLE HEAD RESTRAINT ASSEMBLY

BACKGROUND OF THE INVENTION

1. Technical Field

Embodiments of the invention relate to adjustable vehicle head restraint assemblies.

2. Background Art

Vehicle seats are provided with moveable head restraints, which can move to accommodate a head of an occupant. One example of a vehicle seat having a movable head restraint is disclosed in U.S. Pat. No. 6,983,989 B1, which issued on Jan. 10, 2006 to Veine et al.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
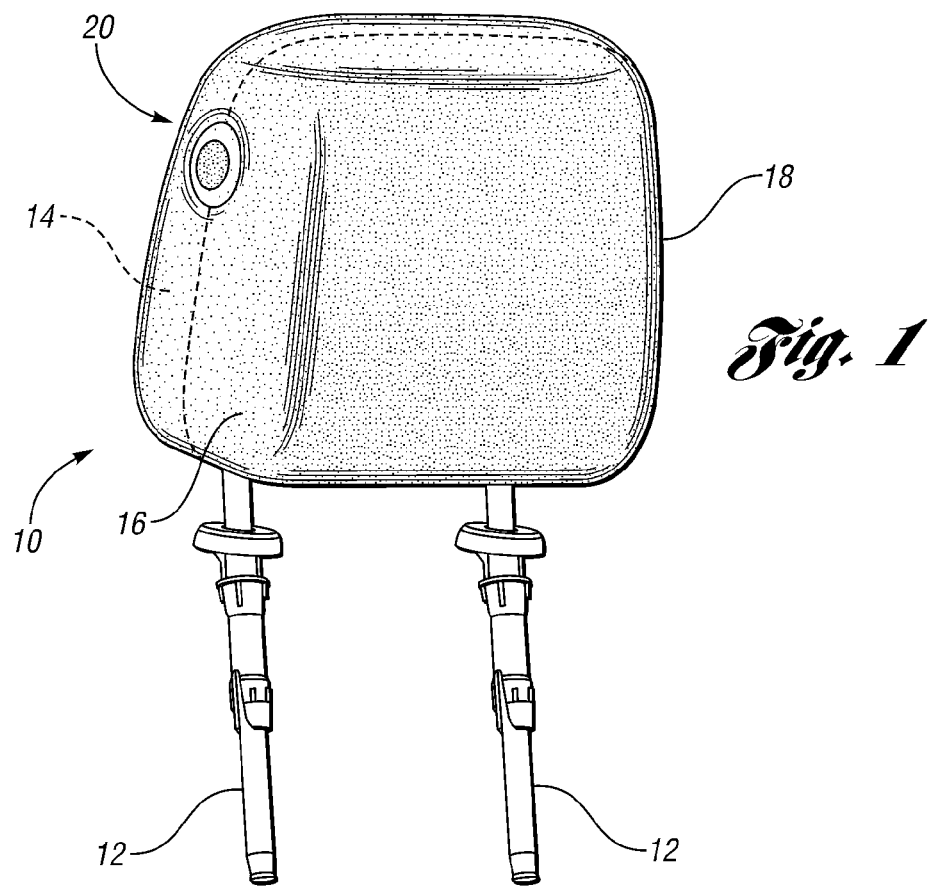
FIG. 1 is a front perspective view of a vehicle head restraint assembly.

With reference to FIG. 1, a head restraint assembly is illustrated and generally referenced by the numeral 10. The head restraint assembly 10 includes support rods 12 that mount the head restraint assembly 10 to a vehicle seat (not shown). The support rods 12 can be mounted within the vehicle seat in any suitable manner that allows for movement of the head restraint assembly 10 that is discussed in detail below. In one embodiment, the pair of support rods 12 are integrally formed as a support rod 12, which is further illustrated in FIG. 3. In another embodiment, the support rods 12 are separately formed and mounted within the head restraint assembly 10. Although a pair of rods 12 is illustrated, any suitable amount of rods 12 are contemplated within the scope of the present invention.

The head restraint assembly 10 has a rear housing 14 and a front housing 16 that collectively define a head restraint 18 to support a head of an occupant. In one embodiment, the front housing 16 is pivotally mounted to the support rods 12 so that the front housing 16 and rear housing 14 can be positioned to accommodate the head of the occupant as desired. In another embodiment, at least a portion of the front housing 16 is moveable relative to the support rods 12 so that the front housing 16 can be positioned to accommodate the head of the occupant as desired by the occupant.

In the depicted embodiment, a release mechanism 20 is mounted on and within the head restraint 18 of the head restraint assembly 10 to release the front housing 16 into motion relative to the support rods 12. In one embodiment, the release mechanism 20 is provided entirely on and within the front housing 16. In another embodiment, the release mechanism 20 is provided entirely within the front housing 16.

The release mechanism 20 provides the front housing 16 with a predetermined range of motion relative to the support rods 12 upon activation of the release mechanism 20. For example, the release mechanism 20 may provide the front housing 16 with twenty degrees of adjustment relative to the support rods 12. In at least one embodiment, the front housing 16 can be positioned and locked in a plurality of predetermined positions relative to the support rods 12. The predetermined positions may be provided with teeth and notches, which is discussed further below. The release mechanism 20 cooperates with internal components provided within the front housing 16 that move the front housing 16 relative to the support rods 12 when activated by the release mechanism 20 as discussed in detail below.

As illustrated, the head restraint 18 is covered with trim and padding 22. The trim 22 provides a trimmed, class A surface that is exposed to an occupant. The trim and padding 22 illustrated may be formed out of multiple pieces of material and assembled together. It is contemplated that trim 22 and padding 22 can be individually utilized and any suitable trim and padding 22 can be utilized within the scope of the present invention.

In one embodiment, the trim 22 is made out of a polyester needle-felt material and the padding 22 is made out of a polyester foam sheet material. In another embodiment, the padding 22 is made out of a polyurethane material. Of course, the trim and padding 22 may be made out of any suitable material within the scope of the present invention. In at least one embodiment, the trim 22 and the padding are approximately ten millimeters thick to provide adequate cushioning to a head of the occupant. Any suitable thickness for the trim and padding 22 is contemplated within the scope of the present invention.

In at least one embodiment, a foam bun (not shown) is not required because the trim and padding 22 provide sufficient cushioning to the head of the occupant.

The rear housing 14 and the front housing 16 each have a desired form, which defines the head restraint 18. When the rear housing 14 and the front housing 16 are covered by the trim and padding 22, the head restraint 18 has a desired form. Of course, any suitable shape for the head restraint 18 with a rear housing 14 and a front housing 16 is contemplated within the scope of the present invention.

Figure 2:
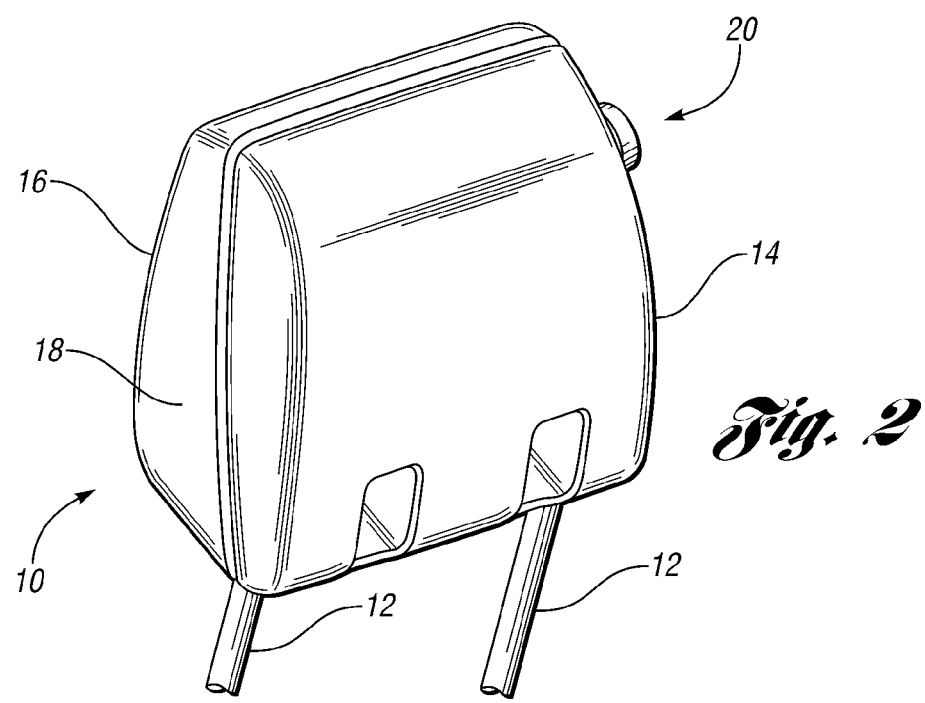
FIG. 2 is a rear perspective view of the vehicle head restraint assembly of FIG. 1.

In FIG. 2, an embodiment of the head restraint assembly 10 is illustrated in an opposite orientation from an orientation of FIG. 1 so that the rear housing 14 is visible. The head restraint 18 is illustrated with the trim and padding 22 removed for illustration purposes. The rear housing 14 and the front housing 16 may have a form that differs from the embodiment illustrated because the illustrated embodiment is merely exemplary. Furthermore, the addition of trim and padding 22 may alter the form of the head restraint 18 as viewed by the occupant.

The release mechanism 20 may be entirely provided within and mounted on the front housing 16 so that a variety of rear housings 14 can be mounted to the front housing 16. By mounting the release mechanism 20 within the front housing 16, the rear housing 14 can be interchangeable and may have various shapes to incorporate various systems. For example, the rear housing 14 may be produced to support a screen, such as a television screen. Of course, the rear housing 14 may have any suitable design within the scope of the present invention.

Figure 3:
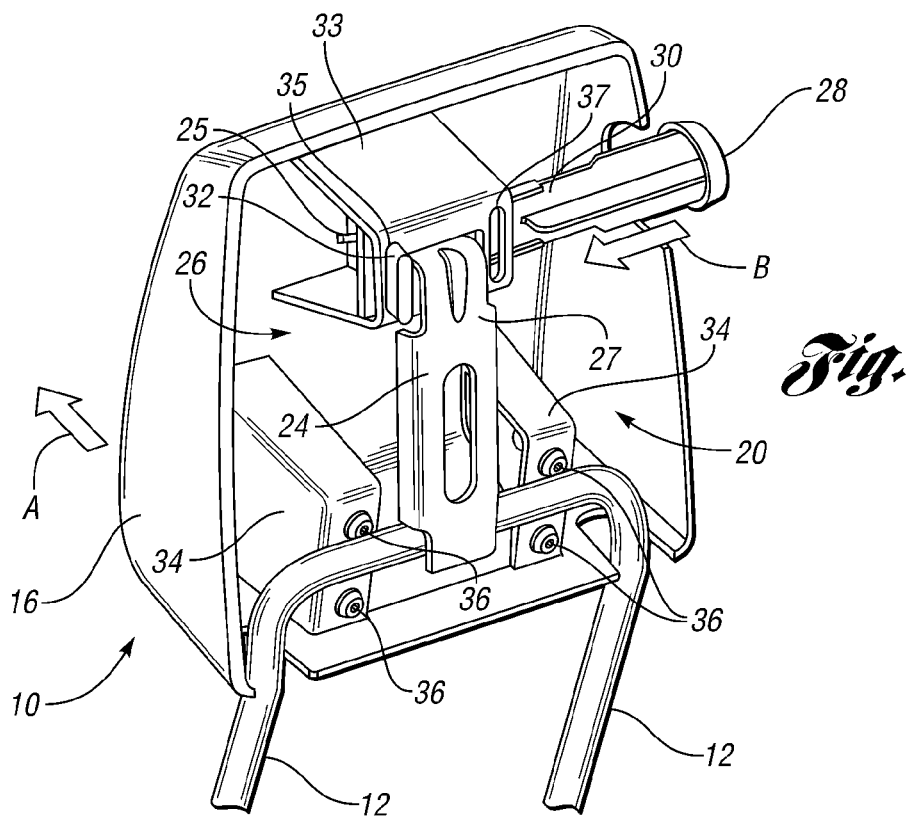
FIG. 3 is a rear perspective view of the vehicle head restraint assembly of FIG. 2 with a portion removed therefrom.
Figure 4:
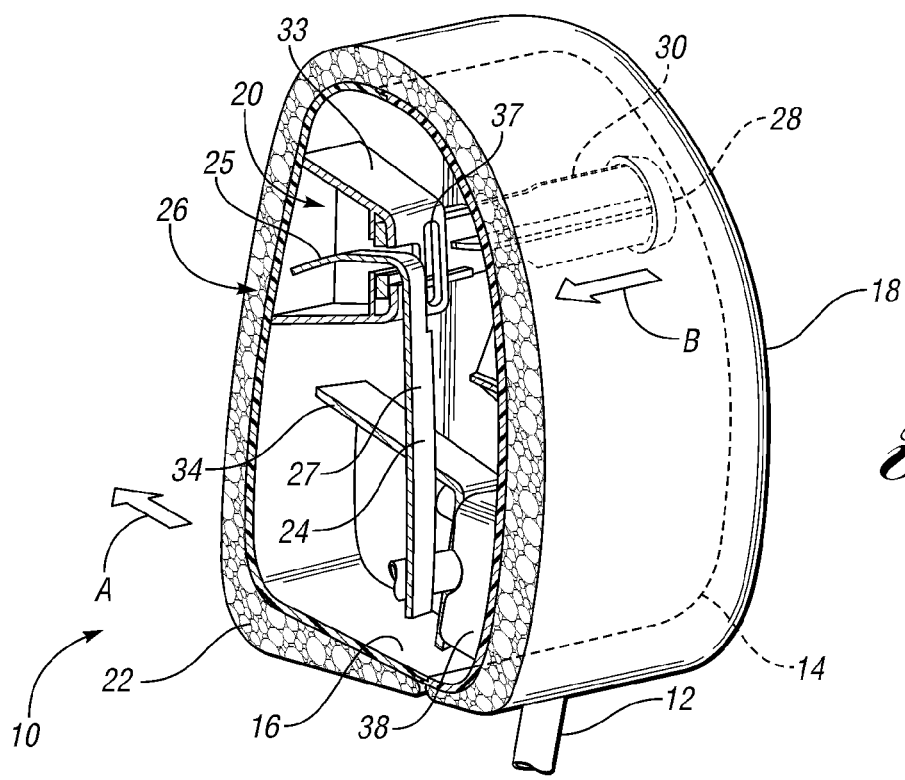
FIG. 4 is partial cross sectional perspective view of another embodiment of a portion the vehicle head restraint assembly of FIG. 3.

With reference now to FIGS. 3 and 4, an embodiment of the head restraint assembly 10 of FIG. 2 is depicted. In FIG. 3, the rear housing 14 of the head restraint assembly 10 of FIG. 2 has been removed, and in FIG. 4, a cross section of FIG. 2 is illustrated. As seen in FIGS. 3 and 4, the release mechanism 20 cooperates with a locking arm 24. The locking arm 24 allows the front housing 16 to move when released from engagement with the release mechanism 20. In at least one embodiment, the locking arm 24 is supported by the support rod 12. The locking arm 24 may be rigidly affixed to the support rod 12. In one embodiment, the locking arm 24 is welded to the support rod 12. Of course, any suitable connection between the support rod 12 and locking arm 24 is contemplated within the scope of the present invention.

In one embodiment, the locking arm 24 has a generally forward portion 25 and a generally upright portion 27. The angle between the generally forward portion 25 and the generally upright portion 27 may vary among various embodiments. The generally forward potion 25 and the generally upright potion 27 may have various curvatures and/or shapes in various embodiments. The upright portion 27 of the locking arm 24 is has a length that is long enough to facilitate control of movement of the front housing 16. Additionally, the length of the upright portion 27 may be long enough to require minimal effort to release the locking arm 24 from the release mechanism 20 while providing maximal movement of the front housing 16. A long length for the upright portion 27 may also measurably reduce angular freeplay relative to the pivoting motion of the locking arm 24.

When the release mechanism 20 is activated, the front housing 16 moves forward relative to the locking arm 24 in the forward direction indicated by arrow A. The occupant can adjust the position of the front housing 16 utilizing the release mechanism 20 to position the front housing 16 in a comfortable position to support the head of the occupant, which can be adjusted as desired. In one embodiment, the release mechanism 20 and the locking arm 24 define a tilt system 26 that collectively allows movement of the front housing 16.

In one embodiment, the release mechanism 20 has a trigger 28, a lateral actuator member 30, a retaining member 32, and a biasing member 42 (depicted in FIG. 5) that are mounted within a support member 33 provided on the front housing 16. The trigger 28, lateral actuator member 30, retaining member 32, and the biasing member 42 (depicted in FIG. 5) collectively lock the locking arm 24 in a design position and release the locking arm 24 when activated by the occupant, which is discussed further below.

As depicted, the support member 33 has a pair of apertures 35, 37 provided therein. The trigger 28 and the lateral actuator member 30 can be provided on a first upright lateral side of the head restraint 18 with the retaining member 32 provided within one aperture 35 of the support member 33 (as shown).

In another embodiment, the trigger 28 and the lateral actuator member 30 are provided on a second upright lateral side of the head restraint 18, opposite the first side, with the retaining member 32 provided within the opposite aperture 37 of the support member 33. The support member 33 allows for installation of the release mechanism 20 on either side of the head restraint 18, which can decrease the amount of parts and/or tooling required to make the head restraint assembly 10 for various types of vehicle seats that can be used in multiple types of vehicles. The decrease in the amount of parts and/or tooling allows for savings in manufacturing costs over the prior art.

The trigger 28 may extend beyond an outer surface of the front housing 16 and may be generally flush with the assembled head restraint 18 when covered with trim and padding 22, as illustrated in FIG. 1. In at least one embodiment, the trigger 28 is a push button 28 so that the occupant can press on the push button 28 to mechanically actuate the release mechanism 20. Of course, any suitable trigger 28 is contemplated within the scope of the present invention.

The trigger 28, as illustrated, is connected to a lateral actuator member 30. When the trigger 28 is actuated, the lateral actuator member 30 is displaced in a lateral direction indicated by arrow B. Displacement of the lateral actuator member 30 releases the retaining member 32 from the locking arm 24. In one embodiment, the generally upright portion 27 of the locking arm 24 is biased in the direction indicated by arrow A to force the front housing 16 to move in the direction indicated by arrow A.

In at least one embodiment, the support rod 12 is provided proximate a front support member 34 of the front housing 16. The front support member 34 can be directly or indirectly mounted on the front housing 16 or integrally formed with the front housing 16. The front support member 34 may abut the support rod 12 so that as the locking arm 24 is pivoted in the direction indicated by arrow A, the support rod 12 is forced to move the front support member 34.

In one embodiment, as illustrated in FIG. 3, the support rod 12 is retained in position against the front support member 34 with guides 36. The guides 36 allow the support rod 12 to force the front support member 34 in the direction indicated by arrow A, while limiting unwanted motion of the support rod 12. Of course, any suitable guide 36 is contemplated within the scope of the present invention and any suitable amount of guides 36 may be utilized.

As clearly depicted in FIG. 4, a rear support member 38 is provided within the rear housing 14 to support and align the support rod 12 with the front support member 34. The rear support member 38 can be mounted on the rear housing 14 or integrally formed with the rear housing 14. In one embodiment, the rear support 38 has guides (not shown) to align the support rod 12 before and after movement in the direction indicated by arrow A. In another embodiment, the rear support 38 is formed to receive the support rod 12 therein for alignment before and after movement of the support rod 12.

Figure 5:
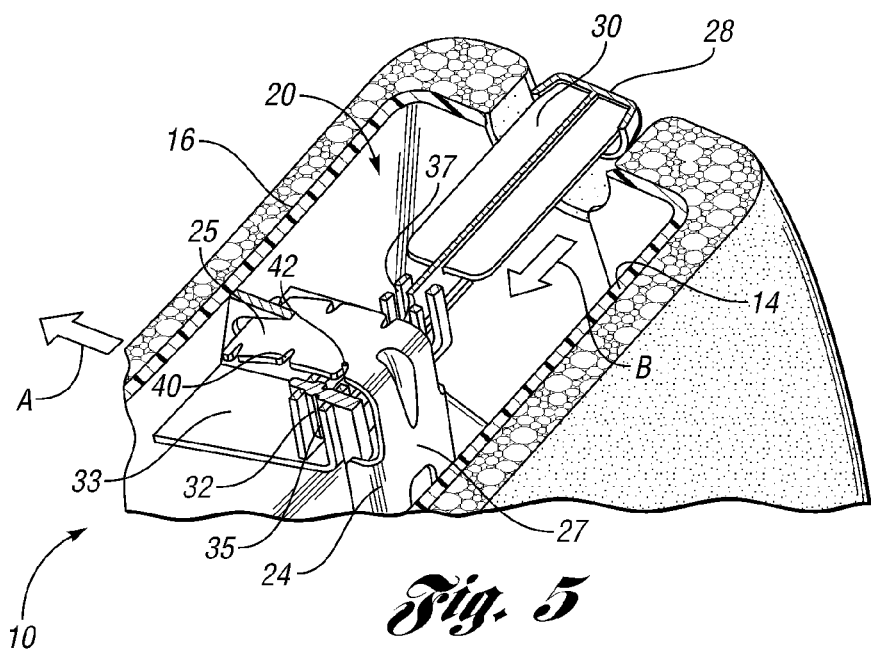
FIG. 5 is another partial cross sectional perspective view of a portion of the vehicle head restraint assembly of FIG. 3.

Referring now to FIG. 5, an enlarged partial cross sectional view of the head restraint assembly 10 including release mechanism 20 and a portion of the locking arm 24 of FIG. 3 is illustrated. A cross section of the support member 33 and the pair of apertures 35, 37 formed therein are illustrated. The retaining member 32 is located in the first aperture 35 and could be located in the second aperture 37 if the orientation of the trigger 28 and the linear actuator bar 30 were reversed.

In at least the depicted embodiment, the forward portion 25 of the locking arm 24 has notches 40 provided therein to cooperate with the release mechanism 20. The forward portion 25 has notches 40 provided on opposing sides thereof so that the orientation of the retaining member 32, the linear actuator bar 30, and the trigger 28 can be reversed to be implemented in various head restraint assemblies. The forward portion 25 has three notches 40 provided on each side thereof, which correspond to three positions for the front housing 16.

As illustrated, the locking arm 24 and front housing 16 are in a design position. After the occupant activates the trigger 28, the linear actuator bar 30 forces the biasing member 42 out of the notch 40 toward the retaining member 32. Once the biasing member 42 is released from the notch 40, the front housing 16 pivots relative to the locking arm 24 in the direction indicated in by arrow A. The notches 40 may be spaced apart at any desired interval and may produce a range of motion for the front housing 16 desired. In one embodiment, the range of motion of the front housing 16 is approximately twenty degrees. In at least one embodiment, five notches 40 are provided to provide five extended positions for the front housing 16 so that the occupant can select from multiple extended positions. Of course, any range of motion of the front housing 16 and amount of extended positions are contemplated within the scope of the present invention.

Figure 6:
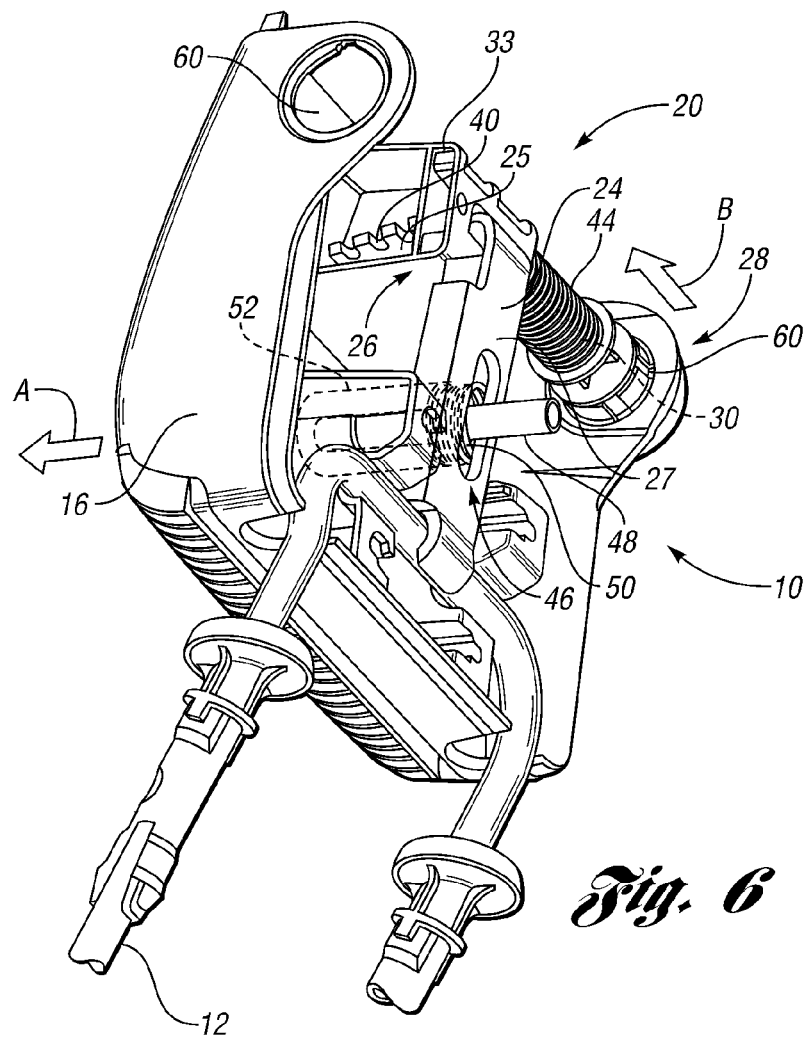
FIG. 6 is a rear perspective view of another embodiment of the vehicle head restraint assembly of FIG. 1 with a portion removed therefrom and oriented in a first position.
Figure 7:
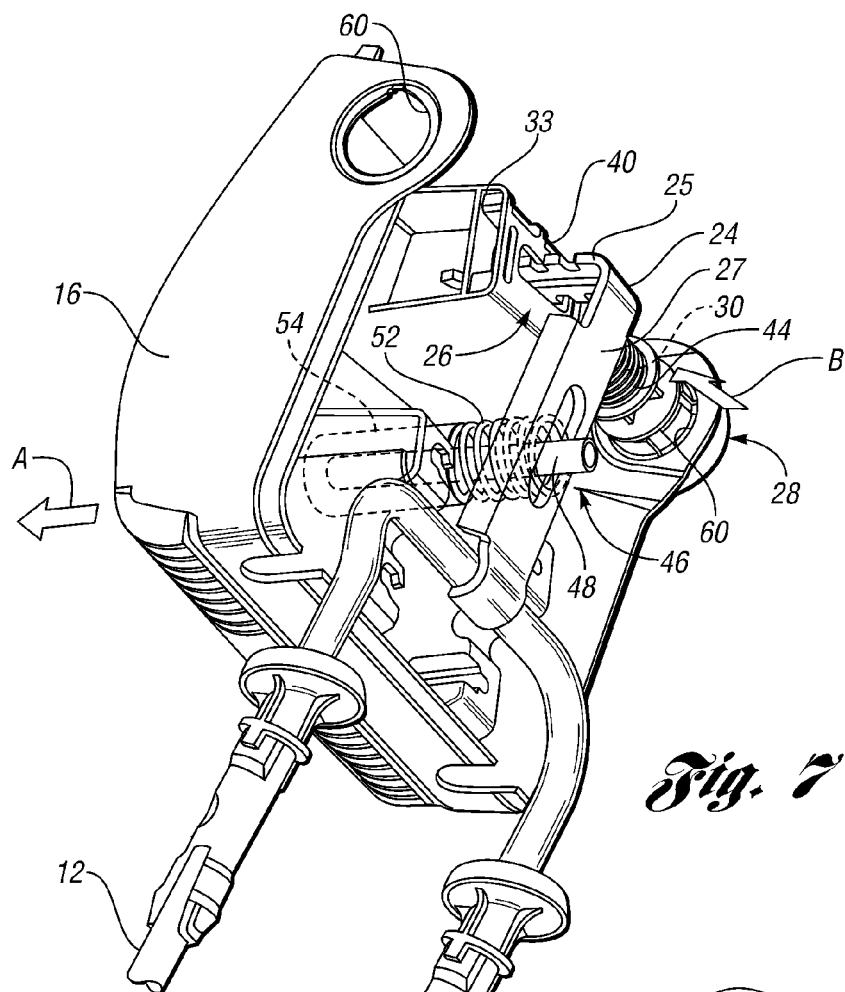
FIG. 7 is a rear perspective view of the vehicle head restraint assembly of FIG. 6 with a portion removed therefrom and oriented in a second position.

With reference to FIGS. 6 and 7, an embodiment of a head restraint assembly 10 is illustrated with the rear housing 14 removed. In FIG. 6, the head restraint assembly 10 is in the design position. In FIG. 7, the head restraint assembly 10 is in an extended position, which occurs after the release mechanism 20 is actuated to allow the locking arm 24 to pivot and move the front housing 16. The extended position can be any position in which the front housing 16 is moved forward relative to the support rods 12.

Figure 8:
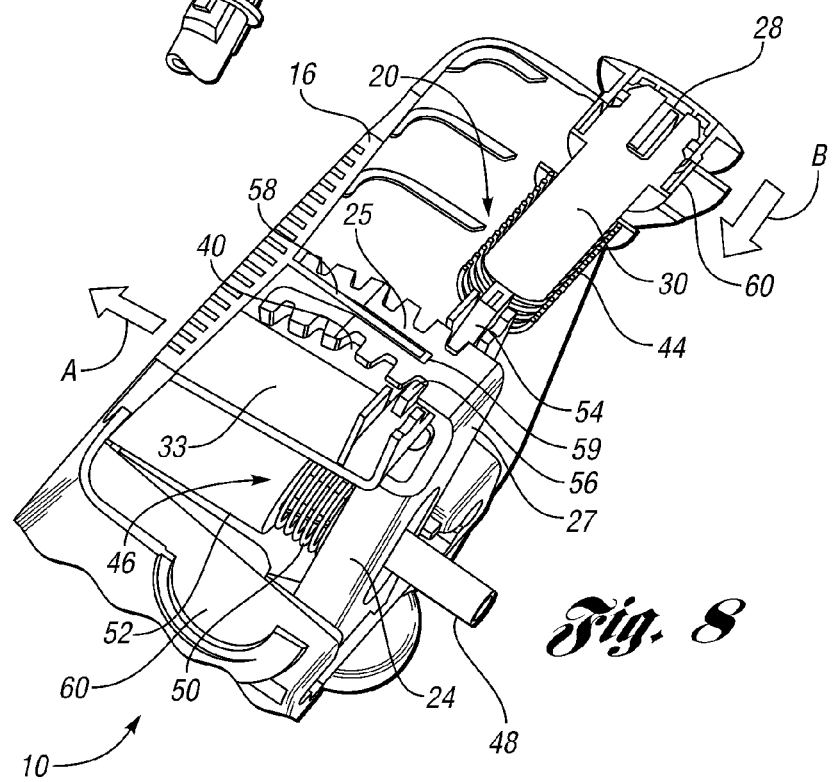
FIG. 8 is a partial cross sectional perspective view of a portion of the vehicle head restraint assembly of FIG. 6.

In one embodiment, the release mechanism has a biasing member 44 mounted proximate the linear actuator bar 30 to return the linear actuator bar 30 to the design position after actuation by trigger 28. As seen in FIG. 8, the biasing member 44 encircles the linear actuator bar 30 and is supported by the front housing 16 near one end and near the support member 33 at a second end. The biasing member 44 is compressed when the occupant activates the trigger 28. After the biasing member 44 is compressed and the trigger 28 no longer engaged or depressed, the biasing member 44 returns the linear actuator bar 30 and the trigger 28 to the design position. In at least one embodiment, the biasing member 44 is a compression spring. Of course, any suitable biasing member 44 to return the trigger 28 to the design position is contemplated within the scope of the present invention.

As seen in FIGS. 6-8, the release mechanism 20 includes a release plate 54. The release plate 54 is oriented between the linear actuator bar 30 and the locking arm 24. In the design position illustrated, the release plate 54 is engaged with the locking arm 24 to refrain the locking arm 24 from undesired movement. When the trigger 28 is activated to displace the linear actuator bar 30, the release plate 54 is displaced. Displacement of the release plate 54 disengages the release plate 54 from the locking arm 24 so that the front housing 16 can pivot relative to the locking arm 24. As illustrated, the release plate 54 has a tooth 56 formed therein to engage with one of the notches 40 formed in the locking arm 24. The tooth 56 facilitates engagement of the release plate 54 and the locking arm 24 so that the locking arm 24 does not slip out of engagement.

Figure 9:
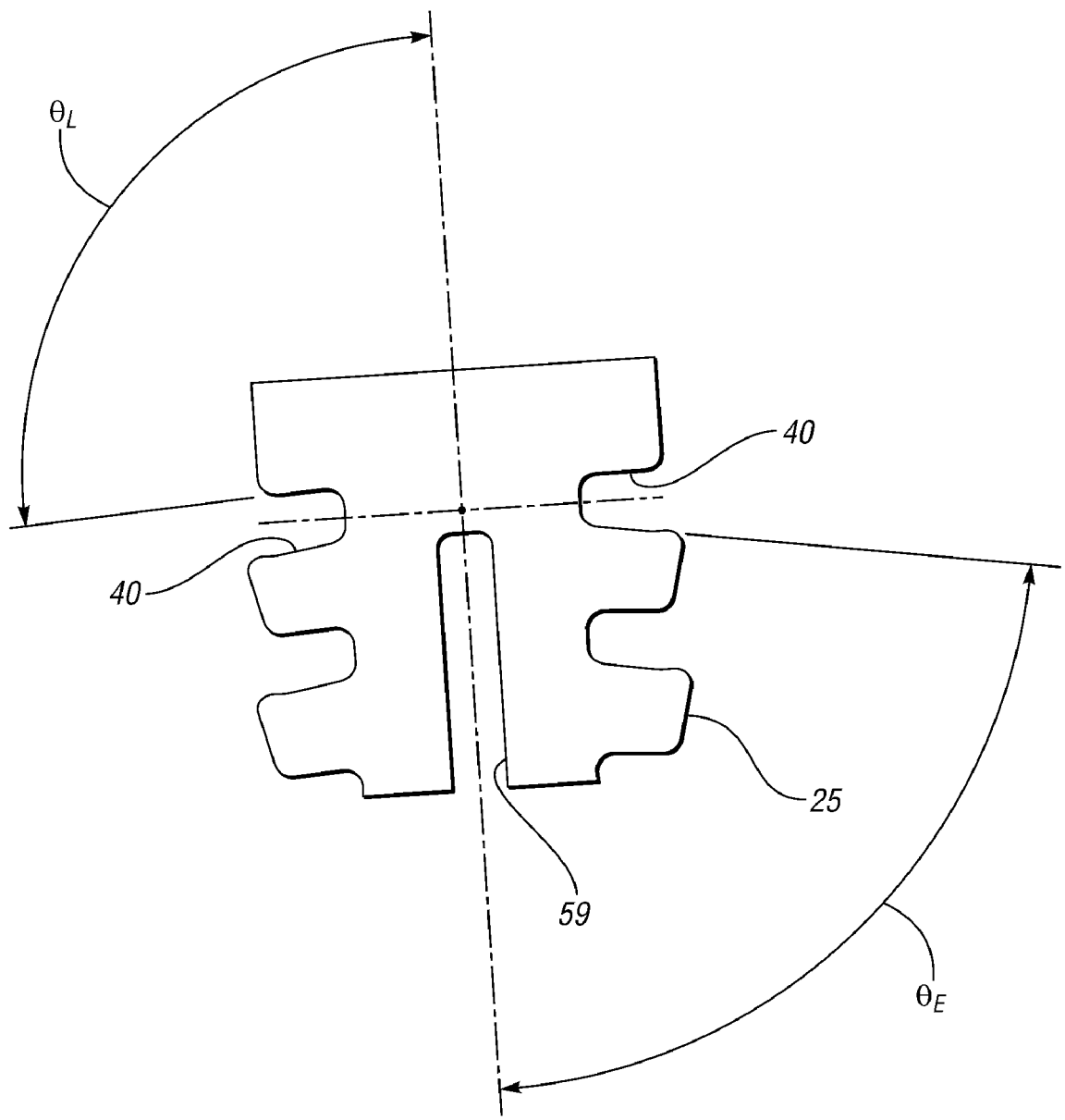
FIG. 9 is an enlarged view of a portion of the partial cross sectional perspective view of FIG. 8.

On embodiment of the forward portion 25 and the notches 40 formed therein is illustrated in FIG. 9. The notches 40 may form an entry angle $\Theta_E$ between a centerline of the forward portion 25 and an edge of the notch 40. The entry angle $\Theta_E$ may be smaller than ninety degrees so that the tooth 56 of the release plate 54 can enter into the notch 40. In at least one embodiment, the entry angle $\Theta_E$ is approximately eighty-one degrees. The notches 40 may form a lock angle $\Theta_L$ with a second edge of the notch 40 and the centerline of the forward portion 25. The lock angle $\Theta_L$ may be greater than ninety degrees. In at least one embodiment, the lock angle $\Theta_L$ is approximately ninety-three degrees. The locking angle $\Theta_L$ may be greater than ninety degrees to increase contact between the notches 40 and the teeth 56. A notch 40 having a locking angle approximately greater than ninety degrees and an entry angle less than ninety degrees maximizes locking resistance between the tooth 56 and the notch 40 with low release effort for the occupant and helps to prevent freeplay in the release mechanism 20.

In at least the embodiment illustrated in FIGS. 6-8, the head restraint assembly 10 includes a forward assist mechanism 46. The forward assist mechanism 46 is connected to the locking arm 24 to facilitate forward motion of the front housing 16 from the design position to the extended position. When the release mechanism 20 disengages from the locking arm 24, the forward assist mechanism 46 forces the front housing 16 to move forward in direction A relative to the support rods 12.

In one embodiment, the forward assist mechanism 46 has a guide rod 48 that is connected to the locking arm 24. The forward assist mechanism 46 may have a biasing member 50 connected to the guide rod 48 to bias the guide rod 48 toward the front housing 16. In at least one embodiment, the forward assist mechanism 46 has a support member 52 to connect the guide rod 48 to the front housing 16. When the occupant activates the trigger 28, the release plate 30 releases from engagement with the locking arm 24. The biasing member 50 of the forward assist mechanism 46 biases the guide rod 48 and locking arm 24 forward relative to the support rods 12. The guide rod 48 pushes the front housing 16 forward relative to the support rods 12 so that the occupant can adjust the position of the head restraint 18 to be in a comfortable extended position.

As illustrated in FIG. 8, the support member 52 has a guide 58 formed therein. The guide 58 interacts with the locking arm 24 to keep the locking arm 24 in alignment within the front housing 16. In at least one embodiment, the forward portion 25 of the locking arm 24 has a channel 59 formed therein, which receives the guide 58 therein. The guide 58 and the channel 59 keep the locking arm 24 aligned both while the locking arm 24 is pivoting and while the locking arm 24 is in the design position, as illustrated. Providing a guide 58 and a channel 59 as depicted keeps the release mechanism 20 and the locking arm 24 contained within the front housing 16. The front housing 16 with the release mechanism 20 and the locking arm 24 can receive many various rear housings to increase the versatility of the head restraint assembly 10.

As depicted in FIG. 6-8, the front housing 16 has a pair of apertures 60 formed therein, which can each receive the trigger 28 of the release mechanism 20. The pair of apertures 60 are provided at opposite sides of the front housing 16 so that the trigger 28 of the release mechanism 20 can be oriented on either side of the head restraint assembly 10. The pair of apertures 60 allow the head restraint assembly 10 increase the versatility of the head restraint assembly 10 so that the head restraint assembly 10 can be included in a variety of vehicle seats that have various sizes and shapes. Although a pair of apertures 60 is illustrated, any suitable amount of apertures 60 is contemplated within the scope of the present invention. Additionally, the apertures 60 may be provided at various locations on the front housing 16 and need not be symmetrical.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle head restraint assembly comprising:
    a support rod extending in an upright direction adapted to be mounted to a seat back of a vehicle seat;
    a housing pivotally mounted to the support rod;
    a locking arm having an upright portion mounted to one of the support rod and the housing and a forward portion extending from the upright portion; and
    a release mechanism mounted to an upright lateral side of the housing and operably engaged with the locking arm along the forward portion such that actuation of the release mechanism disengages the locking arm to pivot the housing in a forward direction relative to the support rod, wherein the locking arm is generally L-shaped such that the forward portion is generally perpendicular to the upright portion.

2. The vehicle head restraint assembly of claim 1 wherein the locking arm further comprises a plurality of notches formed therein such that the release mechanism is operably engaged with the plurality of notches.

3. The vehicle head restraint assembly of claim 2 wherein the release mechanism further comprises a tooth formed therein sized to be received within the plurality of notches of the locking arm wherein the plurality of notches and a centerline of the locking arm form an entry angle less than ninety degrees and a locking angle greater than ninety degrees such that the entry angle allows the tooth to enter one of the plurality of notches and the locking angle forces contact between the one of the plurality of notches and the tooth.

4. The vehicle head restraint assembly of claim 2 wherein the plurality of notches are formed along a lateral side of the forward portion such that the release mechanism disengages the notches when actuated in a lateral direction.

5. The vehicle head restraint assembly of claim 2 wherein the release mechanism further comprises a linear actuator bar such that actuation of the linear actuator bar in a lateral direction releases the release mechanism from one of the plurality of notches of the locking arm.

6. The vehicle head restraint assembly of claim 5 wherein the release mechanism further comprises a push button visibly exposed on the upright lateral side of the housing and connected to the linear actuator bar such that activation of the push button displaces the linear actuator bar.

7. The vehicle head restraint assembly of claim 6 wherein the release mechanism further comprises a biasing member to bias the linear actuator bar toward the push button.

8. The vehicle head restraint assembly of claim 1 further comprising a forward assist mechanism having a biasing member connected to the housing and the locking arm in order to bias the housing forward relative to the support rod when the release mechanism is actuated, the locking arm being biased in an opposite direction from the housing.

9. The vehicle head restraint assembly of claim 1 further comprising an additional support rod and a lateral cross member connecting the support rods wherein the upright portion of the locking arm is mounted to the lateral cross member.

10. A vehicle head restraint assembly comprising:
    a support rod extending in an upright direction adapted to be mounted to a seat back of a vehicle seat;
    a housing pivotally mounted to the support rod;
    a tilt system provided within the housing and connected to the support rod, the tilt system comprising:
    a locking arm connected to the support rod at a first end, and a release plate extending to an upright lateral side of the housing and operably engageable with the locking arm such that actuation of the release plate disengages the release plate from the locking arm thereby allowing the housing to pivot relative to the support rod; and
    a forward assist mechanism having a biasing member connected to the housing and the locking arm in order to bias housing to pivot thereby pivoting the housing in a forward direction relative to the support rods when the release plate is actuated, the assembly further comprising an additional support rod and a lateral cross member connecting the support rods, wherein the locking arm is generally L-shaped and has an upright portion connected to the lateral cross member and a forward portion extending in the forward direction generally perpendicular to the upright portion.

11. The vehicle head restraint assembly of claim 10 wherein the locking arm further comprises a plurality of notches formed therein such that the tilt system is operably engaged with the plurality of notches.

12. The vehicle head restraint assembly of claim 11 wherein the tilt system further comprises a push button visibly exposed on the upright lateral side of the housing and connected to a linear actuator bar such that activation of the push button displaces the linear actuator bar such that actuation of the linear actuator bar in a lateral direction releases the release plate from one of the plurality of notches of the locking arm.

13. The vehicle head restraint assembly of claim 12 wherein the release plate further comprises a biasing member to bias the linear actuator bar toward the push button.

14. A vehicle head restraint assembly comprising:
    a pair of upright support rods extending in an upright direction adapted to be mounted to a seat back of a vehicle seat;
    a lateral cross member extending in generally a lateral direction to connect the upright support rods;
    a housing pivotally mounted to the pair of upright support rods; and
    a tilt system provided within the housing including:
        a locking arm having an upright portion generally extending in the upright direction and connected to the lateral cross member at a first end and a forward portion generally extending in a forward direction and having a plurality of notches provided proximate a second end;
        a lateral actuator extending generally in the lateral direction and operably engageable with the plurality of notches of the locking arm, the lateral actuator mounted along an upright lateral side of the housing,
    wherein actuation of the lateral actuator disengages the lateral actuator from one of the plurality of notches to allow the housing to pivot relative to the lateral cross member.

15. The vehicle head restraint assembly of claim 14 further comprising a forward assist mechanism having a biasing member connected to the housing and the locking arm in order to bias the locking arm to pivot in the backwards direction relative to the lateral cross member, thereby biasing the housing to move forward relative to the to the lateral cross member when the lateral actuator is actuated.

16. The vehicle head restraint assembly of claim 14 wherein the tilt system further comprises a push button visibly exposed on an upright lateral side of the housing and connected to the lateral actuator such that activation of the push button in the lateral direction moves the lateral actuator in the lateral actuator and disengages the lateral actuator from the notches.

17. The vehicle head restraint assembly of claim 14 wherein the locking arm is generally L-shaped such that the forward portion is generally perpendicular to the upright portion.

* * * * *